United States Patent
Franz et al.

[15] 3,694,518
[45] Sept. 26, 1972

[54] DEHYDROCOUPLING PROCESS

[72] Inventors: Raymond A. Franz, Kirkwood; Herbert J. Gebhart, Jr., Ferguson; Phillip D. Montgomery, Creve Coeur, all of Mo.

[73] Assignee: Monsanto Company, St. Louis, Mo.

[22] Filed: Dec. 8, 1970

[21] Appl. No.: 96,238

Related U.S. Application Data

[63] Continuation-in-part of Ser. No. 393, Jan. 2, 1970, abandoned.

[52] U.S. Cl. ..............................260/668 C, 260/670
[51] Int. Cl. .................................................C07c 1/18
[58] Field of Search ...............260/668 C, 670, 680 D

[56] References Cited

UNITED STATES PATENTS 3,205,280   9/1965   Wattimena et al.....260/680 D

*Primary Examiner*—Curtis R. Davis
*Attorney*—Paul L. Passley, John L. Young, Richard W. Sternberg and Neal E. Willis

[57] ABSTRACT

A vapor phase process for converting toluene and/or toluene derivatives in the presence of oxygen and a halogen to stilbene and/or stilbene derivatives.

13 Claims, No Drawings

DEHYDROCOUPLING PROCESS

This application is a continuation-in-part of copending application serial No. 393 filed Jan. 2, 1970 now abandoned.

BACKGROUND OF THE INVENTION

This invention relates to the manufacture of 1,2-diphenylethylene (stilbene) and derivatives thereof.

Stilbene, because of its unsaturated character, is very reactive and may be employed in various organic synthesis. It is useful in the production of products which may be used in the manufacture of dyes, paints and resins. It is also useful in optical brighteners, in pharmaceuticals and as an organic intermediate.

Heretofore, stilbene has not been available in commercial quantities because the attendant yields of the known processes for the manufacture of stilbene have been generally small. Stilbene has been synthesized by dehydrogenation of bibenzyl; by dehydrogenation of 1,2-bis(3-cyclohexen-1-yl) ethylene (U. S. Pat. No. 3,387,050); and by reacting a benzyl mercaptan with a sulfactive catalyst, for example, molybdenum disulfide and copper sulfide (U. S. Pat. No. 2,645,671). Stilbene and halostilbenes have been synthesized by the iodative dehydrocoupling of toluene and halogen substituted toluenes with elemental iodine and molten lithium iodide at toluene conversions of 10–30 percent (U. S. Pat. No. 3,409,680). Trans-p-methyl stilbene has been produced as a by-product in the iodinative hydrocoupling of a propylenetoluene feed mixture using an alkyl metal iodide and an alkyl metal base (U. S. Pat. No. 3,168,584). The production of halogenated stilbenes is disclosed in U. S. Pat. Nos. 2,960,542; 3,004,076; and 3,084,203 by reacting a trihalomethyl substituted aromatic compound (benzotrihalide) with elemental phosphorus and either hydrogen iodide, a hydrocarbon iodide, ammonium iodide, phosphorus iodide, iodine, iodine monochloride or a Group I, II, IIIB, IV, VB, VIA, VIIA, and VIII metal halide.

In the U.S. Pat. No. 2,890,253, a dehydrogenation process is disclosed wherein certain hydrocarbons are converted to less saturated hydrocarbons by heating a vaporized mixture of hydrocarbon feed with at least 0.1 mol of elemental iodine per mol of feed and oxygen in a quantity which does not exceed one molecular weight proportion of oxygen per atomic weight proportion of iodine.

In U.S. Pat. No. 3,247,273, a dehydrogenation process is disclosed wherein certain alkyl aromatic compounds are converted to the corresponding alkenyl aromatic compounds by heating a vaporized mixture of an alkyl aromatic compound with about 0.5 to about 1.5 mols of oxygen per mol of compound and an amount of an iodine liberating material greater than the equivalent of 0.002 to 0.07 mol of iodine per mol of compound while maintaining the partial pressure of the alkyl aromatic compound less than one-fifth atmosphere at a total pressure of 1 atmosphere.

In U.S. Pat. No. 3,205,280, a catalytic dehydrogenation process if disclosed wherein certain hydrocarbons are converted to less saturated hydrocarbons by heating a mixture of a hydrocarbon with at least 0.001 mols of a halogen per mol of hydrocarbon in the presence of free oxygen and a solid catalyst of an alkali metal halide and silver halide and additionally oxides and halides of certain elements.

In U.S. Pat. No. 3,392,205, a dehydrogenation process is disclosed wherein ethylbenzene is converted to styrene by heating ethylbenzene with oxygen in the presence of iodine and an inert heat carrier material.

Styrene is a valuable material useful in the preparation of various polymers. Currently, styrene is commercially produced from benzene which is an expensive starting material. However, it has recently been discovered that styrene can be produced by catalytically reacting stilbene and ethylene. Accordingly, it is highly desirable to be able to obtain stilbene in commercial quantities from an inexpensive starting material such as toluene.

SUMMARY

This invention is directed to a vapor phase process for converting phenylmethane (toluene) to 1,2-diphenylethylene (stilbene).

Accordingly, typical objects of this invention are to provide: (1) an improved vapor phase process for the production of stilbene and derivatives thereof and (2) a vapor phase dehydrocoupling process for converting toluene and toluene derivatives to stilbene and stilbene derivatives.

Other objects, aspects and advantages of this invention will become apparent to those skilled in the art upon further study of this disclosure and the appended claims.

In accordance with this invention toluene and toluene derivatives are dehydrocoupled in a one step process to stilbene and stilbene derivatives by a vapor phase reaction in the presence of oxygen and a halogen. The process is conducted in the absence of an active catalyst. In one aspect the process is advantageously conducted in the presence of a solid heat carrier inert material, i.e., reactor packing. The molar ratio of toluene and/or toluene derivative:oxygen is in the range of about 1:0.1 to 1:1 and preferably is in the range of about 1:0.3 to 1:0.7. The molar ratio of toluene and/or toluene derivative:halogen (measured as moles of $X_2$ where X is chlorine, bromine, iodine or mixtures thereof) is in the range of about 1:0.0001 to 1:0.015 and preferably is in the range of about 1:0.001 to 1:0.01. For example, where elemental iodine is employed 0.015 mol of $I_2$ will be the maximum added, where methyl iodide is employed 0.03 mol of $CH_3I$ will be the maximum added, where dichloroethane is employed 0.015 mol of $C_2H_2Cl_2$ will be the maximum added, and where trichloro-ethane is employed 0.010 mol of $C_2H_3Cl_3$ will be the maximum added.

Any source of oxygen, pure or in admixture with inerts, may be employed in the process of this invention. Air is a satisfactory source of oxygen for use in this invention.

The halogen employed in the process of this invention can be chlorine, bromine, iodine, or mixtures thereof. The selected halogen may be introduced as elemental halogen and/or halogen compounds, such as hydrogen halide, ammonium halide, organic halides or any halogen-containing compound which decomposes under the reaction conditions. Useful organic halides in this invention are, for example, alkyl halides such as methyl chloride, methyl bromide, methyl iodide, the ethyl halides, the butyl halides, and the like; iodoform; and aromatic halides such as chlorobenzene, bromobenzene, iodobenzene, and the like. Any of the above halogens or halogen compounds may be employed in the invention individually or in mixtures of two or more. Elemental iodine is presently the preferred halogen for use in this invention.

As previously stated, the process of this invention can be advantageously improved, i.e., increased conversion of toluene and yield of stilbene, by conducting the process in the presence of inert heat carrier materials. Suitable inert heat carrier materials include, for example, various glass and ceramic materials, materials which are not subject to corrosion by the reaction mixtures involved, silicon carbide, aluminum oxides such as alpha alumina, boron nitride, fire brick, naturally occurring stony materials such as pumice, and the like.

As previously stated, the process of this invention is carried out as a vapor phase reaction. Accordingly, any apparatus of the type suitable for carrying out chemical reactions in the vapor phase may be employed for the practice of this invention. The reactor may contain a packing material such as alpha alumina.

The process of this invention may be operated continuously or intermittently and is carried out at a temperature in the range from about 500° C. to about 750° C. Preferably, the reaction is conducted as a continuous operation and at a temperature in the range of from about 550° C. to about 650° C.

Pressures other than atmospheric may be employed in the process of this invention, however, it will generally be preferred to conduct the reaction at or near atmospheric pressure.

The reaction time for the process of this invention may be selected from a broad operable range which may vary from about 0.1 to about 60 seconds. The reaction time may be defined as the length of time in seconds which the reactant gases measured under reaction conditions are in contact in the reactor. Preferably, the reaction time will be within the range of 0.5 to 20 seconds.

The reactor employed may be brought to the desired reactor temperature before or after introduction of the vaporized reactants. Preferably, the feed materials are preheated, vaporized and generally thoroughly mixed prior to introducing them to the reactor.

The products of the reaction may be recovered from the effluent gas by any appropriate method and means known to the art and further elucidation here will be unnecessary duplication of the art. The unreacted toluene and/or toluene derivatives are recovered and recirculated to the process. Also, the halogen or halogen source is recovered and recirculated to the process.

In addition to the presence of toluene and/or toluene derivatives, oxygen and halogen in the process of this invention, any inert material such as nitrogen, helium, and the like may be present. The inert material may be introduced to the process alone or may be combined with the other materials as feed. Also, water or steam may be present during the reaction and may be introduced to the process alone or with the other materials as feed.

In another aspect of the invention, the introduction of oxygen to the process at staged intervals offers the advantage of attaining higher conversions of the toluene and/or toluene derivative feed and higher yields of stilbene and/or stilbene derivatives. The staging of oxygen to the process may be accomplished by employing a reactor having a plurality of inlet ports spaced along the length of the reactor or by introducing oxygen at time intervals during the reaction time.

DESCRIPTION OF PREFERRED EMBODIMENTS

The following Examples are given as illustrative of the invention and, as such, specifics set forth are not intended to be unduly considered limitations upon the scope of the invention. In Examples I–III, the reactor used is a tubular system fabricated from 96 percent quartz tubing. The tube has an outside diameter of 15 mm and a length of 49.5 centimeters. The tubular reactor unit is supported in a vertical tube furnace. A 6-millimeter outside diameter thermowell is located in the center of the reactor. The reactor is filled with a packing material. Prior to entering the reactor, the reactants are vaporized and introduced into the upper portion, preheat section, of the reactor. The effluent gases from the reactor are chromatographically analyzed.

EXAMPLE I

A mixture of toluene, oxygen, elemental iodine and nitrogen in a molar ratio of 1:0.5:0.005:3.5 is preheated and introduced into the preheater section of the reactor. The reactor is filled with a commercial alpha alumina packing material[3]. The reactant gases pass through the reactor at a temperature of 650° C. and at such a rate to provide a 5 second reaction time under a pressure of 745 millimeters of Hg. Chromatographic analysis of the effluent shows a toluene conversion of 34.3 percent with a stilbene yield of 80.84 weight percent.

EXAMPLE II

A mixture of toluene, air, methyl iodide and methyl chloride in a molar ratio of 2:5:0.4:1.6 is preheated and introduced into the preheater section of the reactor. The reactor is filled with quartz packing. The mixture passes through the reactor at a temperature of 650° C. and at such a rate to provide a 2-second reaction time. Chromatographic analysis of the effluent shows a toluene conversion of 34.5 percent with a stilbene yield of 63.1 weight percent.

EXAMPLE III

A mixture of toluene, ammonium iodide, water and oxygen in a molar ratio of 1:0.01:3.5:0.5 is preheated and introduced into the reactor. The reactor is filled with a commercial alpha alumina packing material[1]. The mixture passes through the reactor at a temperature of 600° C. and at such a rate to provide a 5-second reaction time. Chromatographic analysis of the effluent shows a toluene conversion of 32.1 percent with a stilbene yield of 75.64 percent.

EXAMPLE IV

In this Example the reactor used is a stainless steel tubular system approximately 1 × 12 inches having three entry points located at 3, 6, and 9-inch intervals along the length of the reactor in addition to an entry port at the base of the reactor. The reactor is filled with a commercial alpha alumina packing material[1].

Two runs are made using toluene, elemental iodine, nitrogen and oxygen in a molar ratio of 1:0.005:0.75:0.75. In the first run, the iodine-toluene-nitrogen portion in its entirety is introduced into the reactor at the base entry port. The oxygen portion is divided into four equal streams. A stream of oxygen is introduced at each of the four entry ports of the reactor. In the second run all of the oxygen is introduced along with the other materials into the base entry port of the reactor. The reaction temperature of both runs is 550°C. and the reaction time is 5 seconds. Prior to entering the reactor, in each run, the reactants are vaporized and preheated. The effluent gases from the upper portion of the reactor are chromatographically analyzed. The analyses are set forth in Table I.

TABLE I

| Yield, % | Run 1 | Run 2 |
|---|---|---|
| Stilbene | 60.4 | 27.73 |
| Bibenzyl | 10.38 | 11.56 |
| Carbon monoxide | 2.09 | 8.30 |
| Carbon dioxide | 20.52 | 36.48 |
| Conversion | | |
| Toluene, % | 30.81 | 21.98 |

EXAMPLE V

In this Example, various reactor packing materials are tested. In each test a mixture of toluene, elemental iodine, nitrogen and oxygen in a molar ratio of 1:0.005:3.5:0.5. The reaction temperature is 550° C. and the reaction time is 5 seconds. The effluent gas analysis of each test is set forth in Table II.

TABLE II

| Yield, percent | No packing | Packing I[1] | Packing II[2] | Packing III[3] |
|---|---|---|---|---|
| Trans-stilbene | 66.4 | 76.6 | 65.6 | 71.4 |
| $CO+CO_2$ | 10.6 | 14.0 | 21.0 | 15.4 |
| Conversion: toluene, percent | 11.9 | 42.2 | 22.8 | 25.4 |

[1] Packing I—A commercial Alundum (alpha alumina) packing material having a typical chemical analysis of:

| Component: | Percent |
|---|---|
| $Al_2O_3$ | 99.28 |
| $SiO_2$ | 0.05 |
| $Fe_2O_3$ | 0.15 |
| $TiO_2$ | 0.02 |
| $Na_2O$ | 0.50 | and characterized as:
 Crystal form—alpha alumina
 Chemical nature—amphoteric
 True specific gravity—3.97
 Packing density—Approx 107-119 lb./cu. ft.
 Hardness (Knoop)—2,000; (Mohs)—9.0.

[2] Packing II—A commercial Alundum (alpha alumina) packing material having a typical chemical analysis of:

| Component: | Percent |
|---|---|
| $Al_2O_3$ | 90.40 |
| $SiO_2$ | 8.46 |
| $Fe_2O_3$ | 0.26 |
| $TiO_2$ | 0.28 |
| $CaO$ | 0.04 |
| $MgO$ | 0.07 |
| $Na_2O$ | 0.33 |
| $K_2O$ | 0.09 |
| $ZrO_2+HfO_2$ | 0.05 | and physical properties of:
 Bulk density—1.9-2.1 g./c.c.
 Apparent specific gravity—3.5-3.7
 Packing density—58-78 lb./cu. ft.

[3] Packing III—A commercial Alundum (alpha alumina) packing material having a typical chemical analysis of:

| Component: | Percent |
|---|---|
| $Al_2O_3$ | 84.7 |
| $SiO_2$ | 13.4 |
| $Fe_2O_3$ | 0.20 |
| $TiO_2$ | 0.30 |
| $CaO$ | 0.02 |
| $MgO$ | 0.04 |
| $Na_2O$ | 0.60 |
| $K_2O$ | 0.70 | and physical properties of:
 Bulk density—1.4-1.6 g./c.c.
 Apparent specific gravity—3.3-3.6
 Packing density—44-48 lb./cu. ft.

From the foregoing Examples it is readily apparent to those skilled in the art that the above-described process exhibits excellent selectivity and yields of stilbene. Also, it is apparent that staging the introduction of the oxygen into the process results in excellent selectivity and yield of stilbene and reduction in toluene oxidation.

The reaction of this invention may be conducted for any sufficient length of time to provide a desired conversion of the toluene or toluene derivatives. Generally, the best result of desired products will be obtained when the conversion of toluene or toluene derivatives is between 25 and 75 percent or higher.

It will be obvious to persons skilled in the art that various modifications may be made in the process as described in this application. Accordingly, it is intended that all such modifications which reasonably fall within the scope of the appended claims are included herein.

We claim:

1. The method of preparing 1,2-diphenylethylene and derivatives thereof which consists of contacting in the vapor phase at a temperature in the range of about 500° C. to about 750° C. a phenylmethane and oxygen in a molar ratio of about 0.1 to about 1.0 mol of oxygen per mol of the phenylmethane and at least one halogen in a molar ratio of up to 0.015 mol of halogen per mol of the phenylmethane.

2. The method of claim 1 wherein said contacting is conducted for a period of from about 0.1 to about 60 seconds.

3. The method of claim 1 wherein said halogen is present as elemental iodine.

4. The method of claim 1 wherein said halogen is introduced as a volatile halogen compound.

5. The method of claim 4 wherein said volatile halogen compound is hydrogen iodide.

6. The method of claim 1 wherein said contacting is conducted until at least 25 percent conversion of said phenylmethane is obtained.

7. The method of claim 1 wherein air is used as the source of oxygen.

8. The method of claim 1 wherein said halogen is introduced as ammonium iodide.

9. The method of claim 1 wherein the oxygen is introduced into the reaction at spaced intervals of time.

10. The method of claim 1 wherein the oxygen is introduced into the reaction at spaced locations.

11. The method of preparing 1.2-diphenylethylene and derivatives thereof which consists of contacting, in the presence of an inert heat carrier material, in the vapor phase at a temperature in the range of about 500° C. to about 750° C. a phenylmethane and oxygen in a molar ratio of about 0.1 to about 1.0 mol of oxygen per mol of the phenylmethane and at least one halogen in a molar ratio of up to 0.015 mol of halogen per mol of the phenylmethane.

12. The method of claim 11 wherein said carrier material is an alpha alumina.

13. The method of claim 12 wherein said alpha alumina has a typical chemical analysis of

| component | percent |
|---|---|
| $Al_2O_3$ | 99.28 |
| $SiO_2$ | 0.05 |
| $Fe_2O_3$ | 0.15 |
| $TiO_2$ | 0.02 |
| $Na_2O$ | 0.50 |

* * * * *